(12) United States Patent
Bell

(10) Patent No.: US 7,677,579 B2
(45) Date of Patent: Mar. 16, 2010

(54) SEAL ASSEMBLY FOR DIVIDING AN ANNULAR SPACE IN A DOUBLE-WALLED PIPELINE

(75) Inventor: Michael Antoine Joseph Caroline Bell, Stonehaven (FR)

(73) Assignees: Technip France SA (FR); Technip Offshore UK Limited (GB)

( * ) Notice: Subject to any disclaimer, the term of this patent is extended or adjusted under 35 U.S.C. 154(b) by 0 days.

(21) Appl. No.: 10/514,966

(22) PCT Filed: May 29, 2003

(86) PCT No.: PCT/GB03/02331

§ 371 (c)(1),
(2), (4) Date: Jan. 21, 2005

(87) PCT Pub. No.: WO03/102455

PCT Pub. Date: Dec. 11, 2003

(65) Prior Publication Data

US 2005/0200084 A1   Sep. 15, 2005

(30) Foreign Application Priority Data

May 31, 2002  (FR) .................................. 02 06679
Mar. 13, 2003  (GB) ................................. 0305719.7

(51) Int. Cl.
*F16L 7/02* (2006.01)
*F16L 11/12* (2006.01)
(52) U.S. Cl. ...................................... 277/607; 277/616
(58) Field of Classification Search ................ 277/603, 277/606, 607, 609, 611, 612, 616, 625, 647; 285/123.1, 123.15, 216; 138/112, 113, 104, 138/108, 148; 405/170; 166/120, 387, 242.3; 174/28, 47
See application file for complete search history.

(56) References Cited

U.S. PATENT DOCUMENTS

| | | | | | |
|---|---|---|---|---|---|
| 1,262,107 | A | * | 4/1918 | Sheashley | 166/189 |
| 2,111,027 | A | * | 3/1938 | Martin | 174/47 |
| 2,179,971 | A | * | 11/1939 | Wentz | 174/22 C |
| 2,335,025 | A | * | 11/1943 | Reed | 277/335 |
| 2,396,702 | A | * | 3/1946 | Johnson et al. | 174/77 R |
| 2,930,407 | A | | 3/1960 | Conley et al. | 138/114 |
| 3,033,600 | A | * | 5/1962 | Drysdale | 403/274 |
| 3,377,615 | A | * | 4/1968 | Lutes | 367/4 |
| 3,424,857 | A | * | 1/1969 | Kipp et al. | 174/153 G |
| 3,425,453 | A | * | 2/1969 | Fuller | 138/111 |
| 3,602,630 | A | * | 8/1971 | Sassin | 174/15.5 |
| 3,685,300 | A | * | 8/1972 | Mott et al. | 405/227 |
| 3,779,564 | A | * | 12/1973 | Chookazian | 277/626 |

(Continued)

FOREIGN PATENT DOCUMENTS

DE   34 14 284   10/1985

(Continued)

*Primary Examiner*—Michael Safavi
(74) *Attorney, Agent, or Firm*—Ostrolenk Faber LLP

(57) ABSTRACT

A seal assembly for dividing an annular space defined between an inner and an outer pipe in a double-walled pipeline. The seal assembly comprises an annular member fitted within the annular space and at least one longitudinal conveyor passing through the annular member, wherein the longitudinal conveyor communicates with the annular space on either side of the seal assembly. The longitudinal conveyor may comprise for example an electrical conductor or an optical fiber.

13 Claims, 4 Drawing Sheets

U.S. PATENT DOCUMENTS

| | | | |
|---|---|---|---|
| 3,884,512 A * | 5/1975 | Wesch | 285/123.17 |
| 3,899,631 A * | 8/1975 | Clark | 174/47 |
| 3,907,049 A * | 9/1975 | Baffas | 138/155 |
| 3,955,621 A * | 5/1976 | Webb | 166/355 |
| 4,036,261 A * | 7/1977 | Hauk et al. | 138/96 T |
| 4,070,043 A * | 1/1978 | Becker | 285/123.1 |
| 4,121,858 A | 10/1978 | Schulz | 285/13 |
| 4,122,298 A * | 10/1978 | Brandt | 174/28 |
| 4,129,308 A * | 12/1978 | Hutchison | 277/335 |
| 4,162,865 A * | 7/1979 | Aubet | 405/154.1 |
| 4,261,583 A * | 4/1981 | de Vries et al. | 277/550 |
| 4,332,509 A * | 6/1982 | Reynard et al. | 405/168.1 |
| 4,504,375 A * | 3/1985 | Griffioen | 204/196.38 |
| 4,505,499 A * | 3/1985 | Uglow et al. | 285/42 |
| 4,566,334 A * | 1/1986 | Persson | 73/649 |
| 4,607,469 A * | 8/1986 | Harrison | 52/220.8 |
| 4,619,555 A * | 10/1986 | Skinner et al. | 405/184.2 |
| 4,702,645 A * | 10/1987 | Skinner et al. | 405/184.2 |
| 4,718,678 A * | 1/1988 | Vansant | 277/312 |
| 4,858,963 A | 8/1989 | Kimbrough | 285/123.1 |
| 4,874,328 A * | 10/1989 | Le Dall et al. | 439/278 |
| 4,889,450 A * | 12/1989 | Anne | 405/184.4 |
| 4,930,544 A * | 6/1990 | Ziu | 138/113 |
| 5,172,765 A * | 12/1992 | Sas-Jaworsky et al. | 166/384 |
| H1246 H * | 11/1993 | Huffaker et al. | 405/223.1 |
| 5,280,825 A * | 1/1994 | Cholet | 166/311 |
| 5,286,040 A * | 2/1994 | Gavin | 277/606 |
| 5,290,073 A | 3/1994 | Chen | 285/149.1 |
| 5,316,492 A * | 5/1994 | Schaareman | 439/206 |
| 5,358,418 A * | 10/1994 | Carmichael | 439/190 |
| 5,505,259 A * | 4/1996 | Wittrisch et al. | 166/250.01 |
| 5,753,098 A * | 5/1998 | Bess et al. | 205/501 |
| 5,775,702 A * | 7/1998 | Laeremans et al. | 277/314 |
| 6,000,420 A * | 12/1999 | Nicholson et al. | 137/15.01 |
| 6,003,873 A * | 12/1999 | Solberg | 277/323 |
| 6,102,077 A * | 8/2000 | Legallais et al. | 138/115 |
| 6,116,290 A * | 9/2000 | Ohrn et al. | 138/149 |
| 6,173,788 B1 * | 1/2001 | Lembcke et al. | 166/387 |
| 6,220,351 B1 * | 4/2001 | Tovar De Pablos | 166/242.3 |
| 6,325,144 B1 * | 12/2001 | Turley et al. | 166/120 |
| 6,364,022 B1 * | 4/2002 | Kodaissi et al. | 166/367 |
| 6,367,845 B1 * | 4/2002 | Otten et al. | 285/119 |
| 6,394,140 B1 * | 5/2002 | Peacock et al. | 138/112 |
| 6,447,323 B1 * | 9/2002 | Watanabe | 439/371 |
| 6,520,505 B1 * | 2/2003 | Kogler et al. | 277/314 |
| 6,564,831 B1 * | 5/2003 | Sanoner et al. | 138/115 |
| 6,601,852 B1 * | 8/2003 | Kogler et al. | 277/314 |
| 6,691,975 B1 * | 2/2004 | Gavin | 249/39 |
| 6,915,052 B2 * | 7/2005 | Boogh | 385/112 |
| 6,923,792 B2 * | 8/2005 | Staid et al. | 604/249 |
| 7,036,531 B2 * | 5/2006 | Manini et al. | 138/149 |
| 7,086,652 B1 * | 8/2006 | Gavin | 277/604 |
| 7,243,716 B2 * | 7/2007 | Denniel et al. | 166/242.2 |
| 2001/0025664 A1 * | 10/2001 | Quigley et al. | 138/125 |
| 2003/0085531 A1 * | 5/2003 | Grabe | 277/628 |
| 2004/0060693 A1 * | 4/2004 | Bass et al. | 166/57 |
| 2004/0076478 A1 * | 4/2004 | Legras et al. | 405/224.2 |
| 2005/0054228 A1 * | 3/2005 | March | 439/191 |
| 2005/0103489 A1 * | 5/2005 | Denniel et al. | 166/65.1 |
| 2005/0206086 A1 * | 9/2005 | Bell et al. | 277/338 |
| 2005/0232703 A1 * | 10/2005 | Saint-Marcoux | 405/154.1 |
| 2006/0032036 A1 * | 2/2006 | Bastard et al. | 029/455.1 |
| 2006/0175063 A1 * | 8/2006 | Balkanyi et al. | 166/357 |

FOREIGN PATENT DOCUMENTS

| | | | |
|---|---|---|---|
| DE | 34 14 284 C 2 | * | 6/1987 |
| GB | 305 478 | * | 12/1929 |
| GB | 655 137 | * | 7/1951 |
| GB | 656 984 | * | 9/1951 |
| GB | 708 521 | * | 5/1954 |
| GB | 1 276 052 | * | 6/1972 |
| GB | 2 084 284 | * | 4/1982 |
| GB | 2 317 934 | | 4/1998 |
| JP | 61-142223 | * | 6/1986 |
| JP | 2002-46251 | | 2/2002 |
| JP | 2002-46251 A | * | 2/2002 |
| WO | WO 86/03362 | * | 6/1986 |
| WO | WO90/14544 | * | 11/1990 |
| WO | 00/09926 | | 2/2000 |
| WO | WO 03/60368 A1 | * | 7/2003 |

* cited by examiner

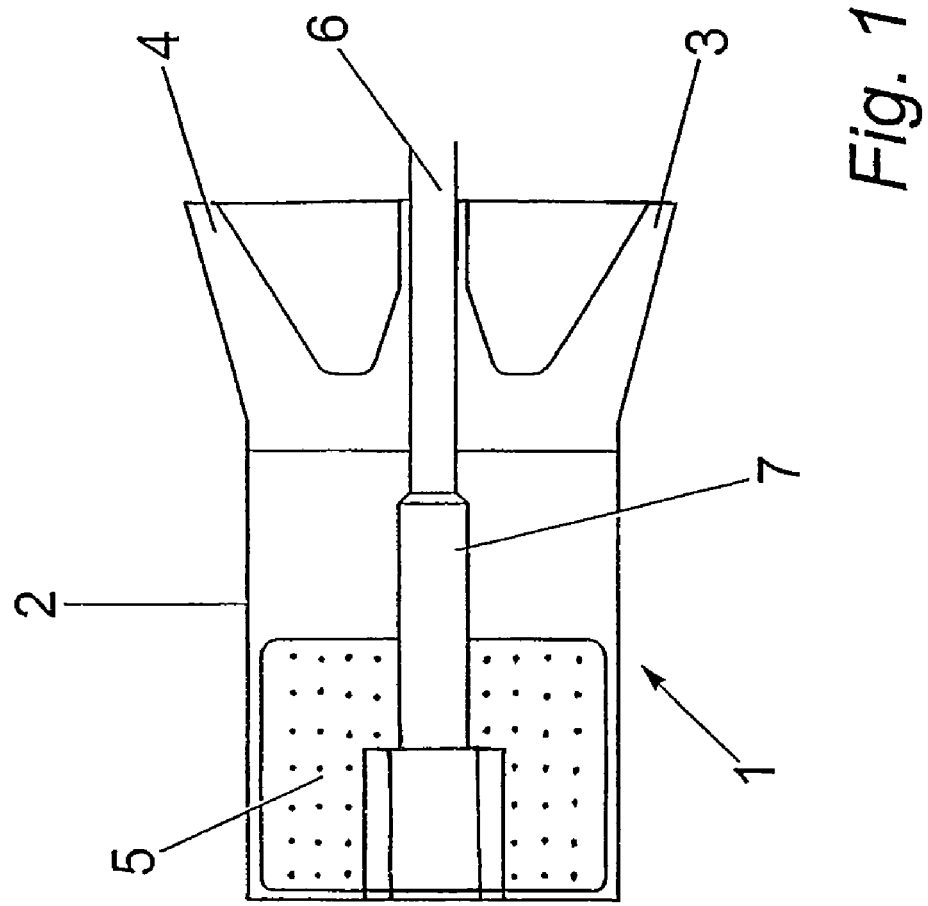

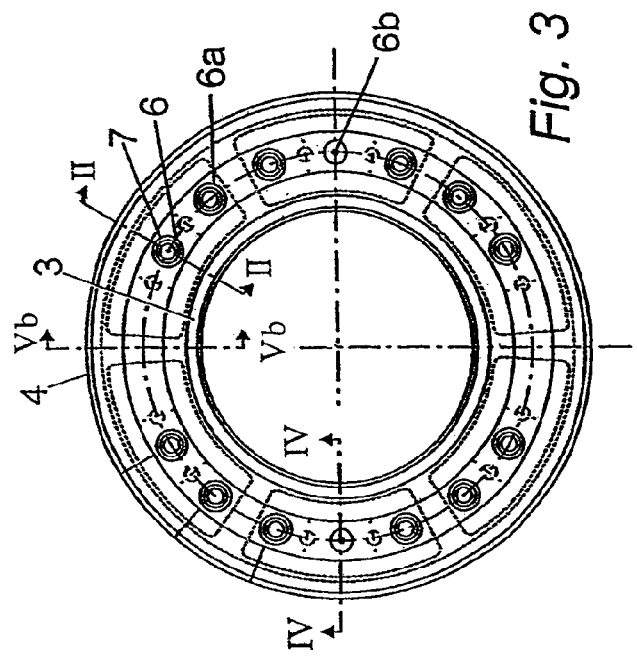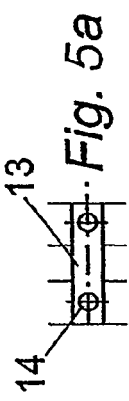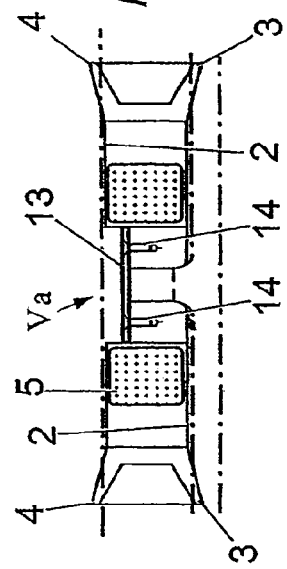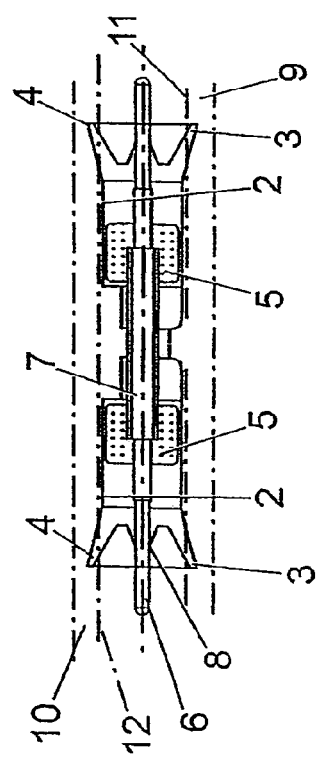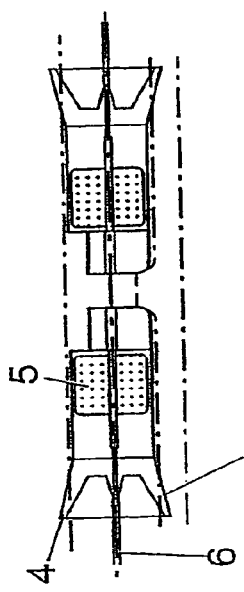

SEAL ASSEMBLY FOR DIVIDING AN ANNULAR SPACE IN A DOUBLE-WALLED PIPELINE

CROSS REFERENCE TO RELATED APPLICATIONS

The present application is a 35 U.S.C. 371 national phase conversion of International Application No. PCT/GB03/02331 filed 29 May 2003, which claims priority of France Application No. 02/06679 filed 31 May 2002. and Great Britain Application No. 0305719.7 filed 13 Mar. 2003.

FIELD OF THE INVENTION

The present invention relates to double-walled pipelines used for transporting fluids such as oil and gas. In particular it relates to a seal assembly (also referred to as a water stop) for use in sealing an annular space between an inner pipe and an outer pipe in such a double-walled pipeline.

BACKGROUND OF THE INVENTION

Pipelines carrying heavy or crude oil need to be thermally insulated as heavy oil tends to solidify during transport from a subsea production well to the surface due to heat losses in the submerged pipeline. Thermal insulation is also required to avoid the formation of hydrates which can occur for certain crude oil compositions when the crude oil cools down, for example, when there is a breakdown in production flow rate.

Production lines which require a high level of thermal insulation typically use a double-walled pipe structure, for example a pipe-in-pipe system. A pipe-in-pipe system comprises an internal pipe within an external pipe separated by an annulus volume. In such a structure, the annular space can be filled with thermal insulation material. This structure has the advantage that the external pipe keeps the annular space dry and so, for example, in subsea pipelines, the thermal insulation material is protected from water. A further advantage of this structure is that the pressure in the annulus can be different from that outside the external pipe and that inside the internal pipe. This is important if the insulating material has a particular pressure requirement or if a vacuum or partial vacuum is to be used for insulating purposes. For example, the annulus can be at atmospheric pressure while the hydrostatic pressure experienced by the external (or carrier) pipe and the internal pressure of the fluid in the internal pipe (flowline) are different. Furthermore it is interesting to lower the pressure in the annulus in order to increase the thermal insulation performance.

One of the problems associated with such pipelines is that of safeguarding the annular space against the ingress of water, for example due to leaks in the external or carrier pipe. Water in the annular space will conduct heat from the inner flowline to the carrier pipe thus destroying the effectiveness of the insulation. This problem has been approached in prior art pipe-in-pipe systems by compartmentalising the annular space by means of permanent seals (GB 2 317 934, U.S. Pat. No. 2,930,407, WO 00/09926).

Such prior art seals or waterstops are useful for compartmentalisation of the annulus in the longitudinal direction so that it can remain partially dry in case of a leak in the carrier pipe. However, such an arrangement has a major drawback when it is desired to combine passive thermal insulation with an active heating system which may require the use of electrical cabling or hoses with heat transfer fluid. Waterstops create discontinuities and block passage of any equipment running along the length of the production line, such as that which may be required for an active heating system.

SUMMARY

The above problem is addressed by the seal assembly of the present invention.

In accordance with the invention there is provided a seal assembly for sealing an annular space defined between an inner and an outer pipe in a double-walled pipeline comprising an annular member and at least one longitudinal conveying means passing through the annular member, wherein said longitudinal conveying means communicate with the annular space on either side of the seal assembly.

Typically, the longitudinal conveying means comprises one or more electrical conduction.

Preferably the longitudinal conveying means comprises one or more heat transfer means and one or more optical fibers housed within optical fibers housing tubes.

BRIEF DESCRIPTION OF THE DRAWINGS

Embodiments of the invention will now be described, by way of example only, with reference to the accompanying drawings in which:

FIG. 1 is a cross-sectional view of a seal assembly according to the present invention;

FIG. 2 is a cross-sectional view, taken along the line II-II in FIG. 3, of a seal according to the invention, with internal and external pipes shown in broken lines;

FIG. 3 is a plan view of a seal assembly according to the invention;

FIG. 4 is a sectional view of the seal assembly shown in FIG. 3 taken along the line IV-IV;

FIG. 5*a* is a view of the tie-straps shown in FIG. 5*b* from position Va;

FIG. 5*b* is a sectional view of the seal assembly shown in FIG. 3 taken along the line Vb-Vb;

DETAILED DESCRIPTION OF THE INVENTION

Figure 6:
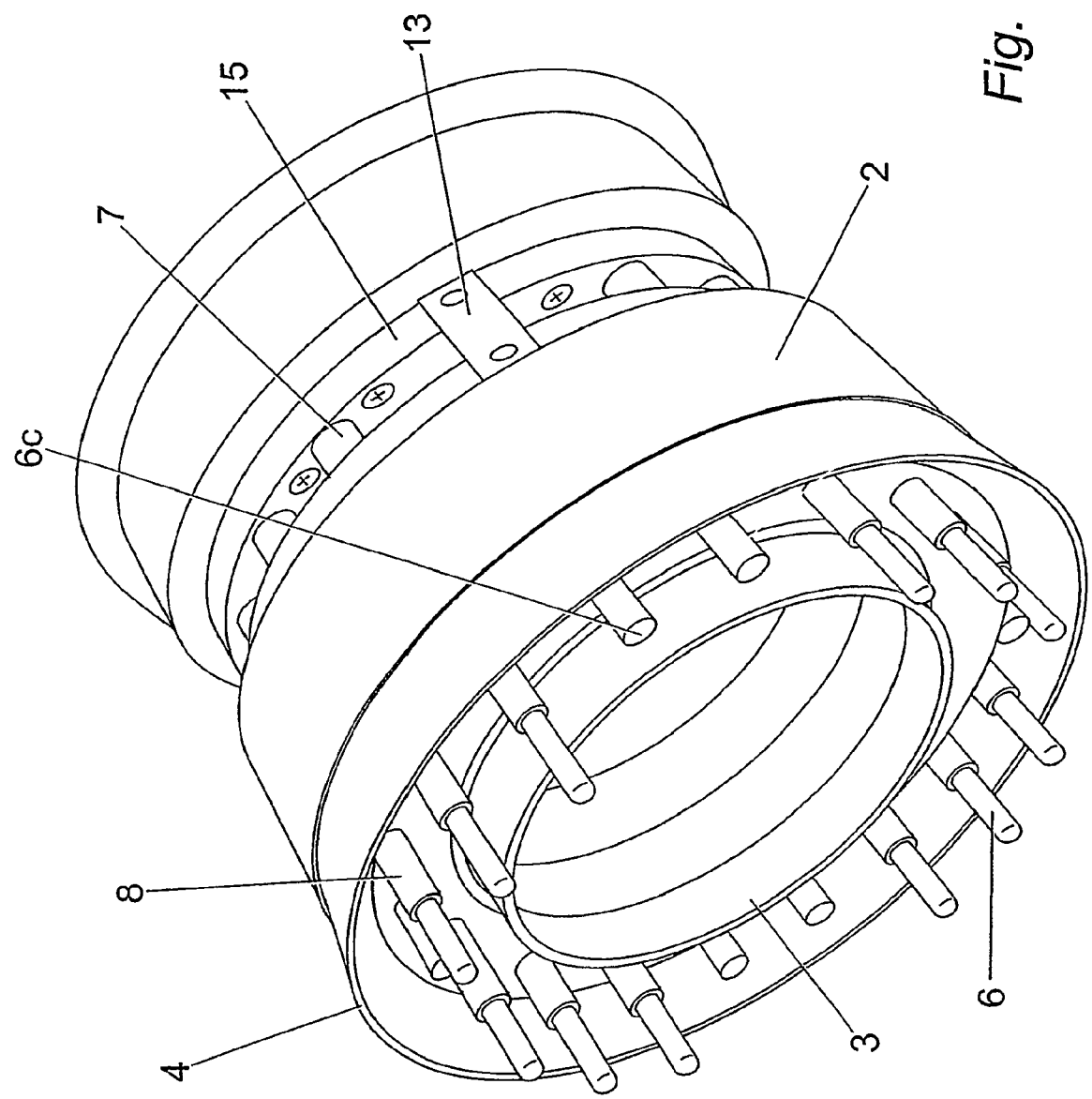
FIG. 6 is a perspective view of a seal assembly according to one embodiment of the invention.

With reference to FIGS. 1 to 4, a seal assembly comprises an annular member (1), having a body (2) with inner and outer lips (3, 4), and longitudinal conveying means (6) passing therethrough. The annular member (1) may further comprise an insert (5) of steel or the like for strengthening/rigidity purposes.

The inner and outer lips (3, 4) preferably extend beyond the inner and outer circumference of the body (2) of the annular member (1). The inner and outer lips (3, 4) are preferably made of a resilient deformable material, typically a rubber or elastomeric material such as polyurethane for example. The body (2) of the annular member (1) is preferably made of a more rigid material, such as a harder polyurethane material, and may contain a strengthening insert (5) typically made of nylon or metal for example.

When the seal assembly is inserted into the annular space between the inner and outer pipes (9, 10) of a pipe-in-pipe system (as shown in FIG. 2) the inner and outer lips (3,4) are deformed wedging the annular member (1) in place. Thus the inner lip (3) forms a liquid tight seal against the outer wall (11) of the pipe (9) and outer lip (4) forms a liquid tight seal against the inner wall (12) of the outer pipe (10).

Preferably said longitudinal conveying means (6) comprises electrical conducting means traversing the water stop. Typically the electrical conducting means may be in the form of a cable or of a rod (6a). The electrical conducting means may comprise a rod traversing the waterstop that is connected at either end, via suitable connection means, to a cable running along the inner pipe between waterstops. The use of a rod with a relatively large cross section inserted directly within the waterstop body to convey electrical power alleviates the problem of overheating which could occur when using electrical heating cables inserted directly in the waterstop.

A sleeve (8) may be provided at the point between the inner and outer lips (3, 4) where the longitudinal conveying means exits the seal assembly. The sleeve (8) surrounds the longitudinal conveying means (6) and is molded from the waterstop body (2) of the annular member (1). When the longitudinal conveying means (6) comprises a rod (6a) for conveying electrical power, a heat shrink sleeve (16) may be used to surround the connection between the rod (6a) and a cable for conveying electrical power (6e). In this case the heat shrink sleeve (16) surrounds the sleeve (8) of the waterstop body (2) of the annular member (1), the connection and the cable end to ensure that the connection is completely insulated and protected against any ingress of water.

Typically the sleeve (8) will be formed via a molded node formed in the annular member during manufacture. The longitudinal conveying means may then be put in place by forcing it through the node. Additional nodes (see 6c FIG. 6) may be formed in the annular member which facilitate incorporation of additional longitudinal conveying means at a later date.

Longitudinal conveying means (6) facilitates communication through the seal assembly to the annular space on either side. Said longitudinal conveying means may optionally comprise heat transfer means, such as a tube (6d) to connect heat transfer fluid hoses or information/data transfer means, such as an optical fiber, for example.

Figure 7:
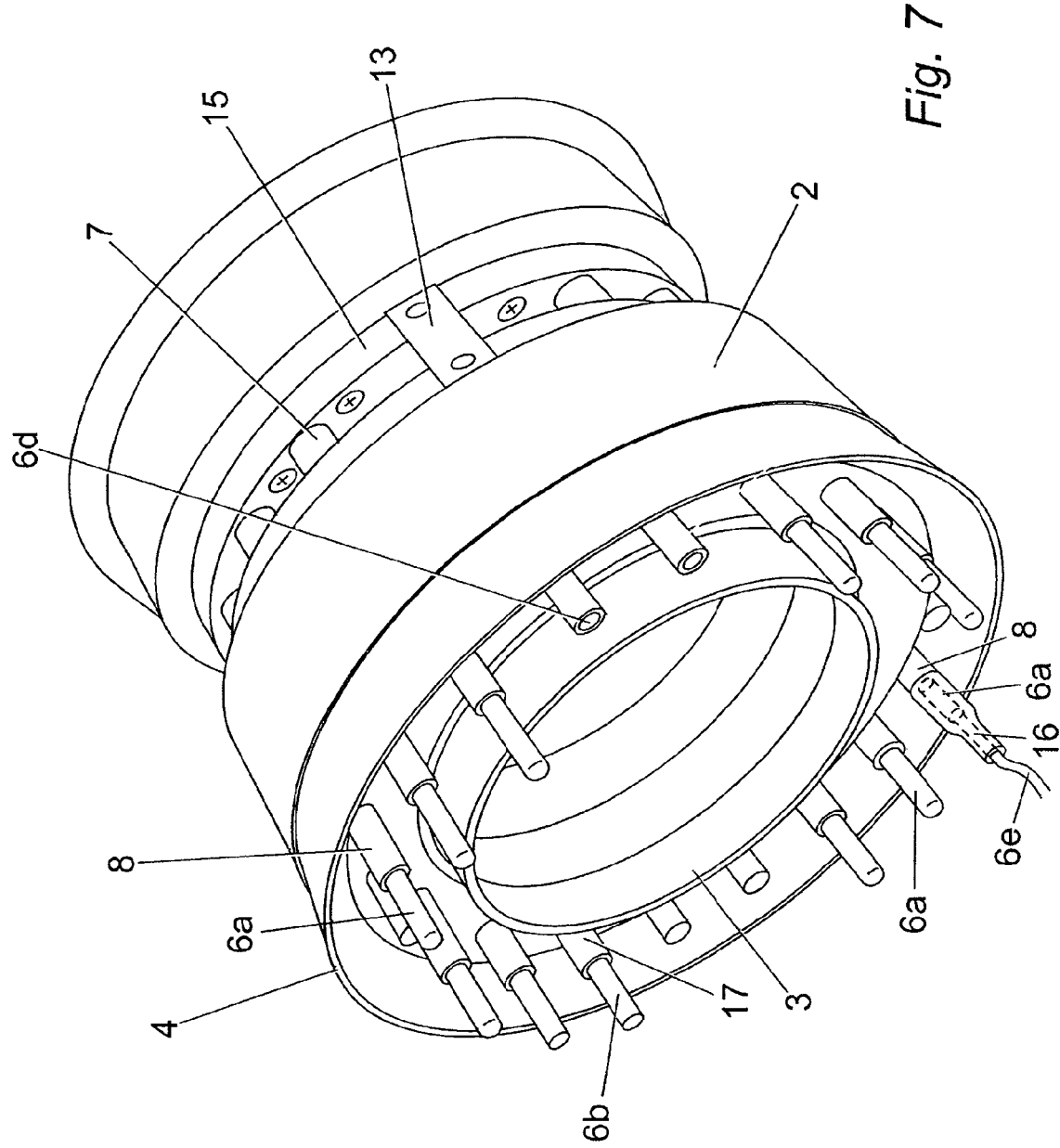
FIG. 7 is a perspective view of a seal assembly according to other embodiments of the invention.

A backing ring (15, see FIG. 7) may be provided for connecting adjacent seal assemblies. The backing ring (15) fixed to a shoulder on a waterstop body (2) of the annular member (1) may be attached to the backing ring (15) of an adjacent seal assembly via a tie-strap (13) and suitable fixing means (14). Typically the fixing means (14) may comprise rivets, nut and bolts arrangements or the like.

Two or more different types of longitudinal conveying means may be used in combination. For example a seal assembly may comprise a plurality of copper rods used to convey electrical power to heating cables for heating the annular space in the pipe-in-pipe system together with one or more optical fibers for monitoring temperature within or curvature of the system. FIG. 3 is a plan view of an annular member (1) with a first type of longitudinal conveying means comprising four groups of three conductor rods (6a) and a second type of longitudinal conveying means comprising two optical fibers (6b).

In the case where the longitudinal conveying means comprises an optical fiber (6b), the optical fiber may be housed in a tube (17) passing through the seal assembly. A suitable sealant, such as an epoxy resin, may be introduced within the tube in order to ensure the sealing of the optical fiber within the seal assembly.

Generally seal assemblies, whose inner and outer lips (3, 4) are on one side of each seal assembly, (see FIG. 1), form a liquid tight seal against the inner pipe (9) and the outer pipe (10), such seal assemblies being hereinafter referred to as "one-sided seal assemblies," such as those shown in the FIG. 1, are used in pairs as illustrated in FIGS. 2 to 6, so that the combined effect is to prevent water flow in either direction. Between the one-sided seal assemblies of a pair of one-sided seal assemblies the longitudinal conveying means may be covered, for example a polyurethane sheath or coating (7) may be used to provide insulation (for example in the case where the longitudinal conveying means (6) comprises electrical conducting means). Furthermore, in the case where the longitudinal conveying means (6) comprises an optical fiber for monitoring temperature, the optical fiber may be in contact with the flow line pipe or with a metal element linked to the flow line pipe between two one-sided seal assemblies. Cold spots may exist between two one-sided waterstop assemblies in a pipe system using active heating since the heating cables do not contact the flow line pipe between the seal assemblies. The optical fiber arrangement described has the advantage that it facilitates monitoring of such cold spots.

The present invention further relates to a method of manufacturing a seal assembly comprising the steps of molding a body (2) of the annular member (1) from a suitable material, moulding an end piece having inner and outer lips (3, 4) from a suitable material, sealably attaching said body (2) of the annular member (1) to said end piece and incorporating longitudinal conveying means which traverses the seal assembly.

Preferably, the method of the invention further comprises the step of forming one or more nodes in the end piece, said nodes are adapted to facilitate incorporation of the longitudinal conveying means. For example the nodes may be manufactured in such a manner that the longitudinal conveying means can be passed through the end piece in a heat shrink operation which forms a heat shrink seal between the end piece and the longitudinal conveying means (6).

Preferably, the nodes are manufactured from a resilient material in the form of tubes, the diameter of which is less than that of the longitudinal conveying means. The longitudinal conveying means, for example an electrically conducting rod may then be forced through the resilient tubular node thus ensuring a good fit and seal between the end piece and the longitudinal conveying means.

One or more auxiliary or supplemental nodes (6c) may be formed in the end piece in order to facilitate later incorporation of additional longitudinal conveying means. In an alternative manufacturing method, the waterstop body (2) of the annular member (1) can be molded with the longitudinal conveying means (6) in the mold.

The present invention also provides a pipe system comprising an inner pipe and an outer pipe and a seal assembly described herein. For example the pipe system may comprise an inner pipe and an outer pipe with electrical heating cables running along the flow line or inner pipe, the electrical heating cable being connected to one or more rods traversing each seal assembly. Such a pipe system may further comprise heat dissipation means close to the seal assembly, at the point where the heating cable is lifted from the flow line to be connected to the rod of the seal assembly. Such heat dissipation means may comprise a thin aluminium layer wrapped around the external sheath of the cable and linked to the flow line so as to prevent overheating of the cable.

The design of the waterstop or seal assembly and the internal surface of the carrier pipe may provide for relative movement between the carrier pipe and the waterstop fixed on the flow line pipe. Such relative movement may be advantageous in that it facilitates a reduction of the number of in-line connections of the heating electrical cables required during manufacture of the pipe system.

The annular space in the pipe system may also comprise insulation material and/or one or more elements chosen from bulkheads to transfer loads (services or handling loads)

between the carrier pipe and the flowline; spacers to centre the flowline within the carrier pipe; buckle arrestors to prevent the propagation of a buckle along the carrier pipe. Preferably the seal assemblies are installed near to buckle arrestors so that when buckle propagation is stopped, any water leak due to the buckle will not be allowed to proceed through the double walled pipeline annulus.

The invention claimed is:

1. A combination of a double-walled pipe and at least one seal assembly,
   the double-walled pipe comprising one inner pipe and one outer pipe, the inner and outer pipes being concentrically arranged, the inner pipe being operable to transport a fluid, an annular space being defined between the inner and outer pipes, and
   the seal assembly comprising an annular member dimensioned to fit within the annular space, the seal assembly dividing the annular space longitudinally, the seal assembly further comprising at least one longitudinal conveying device passing through the annular member, wherein the longitudinal conveying device communicates with the annular space on either side of the seal assembly, the longitudinal conveying device being of a shorter length than the double-walled pipe, the seal assembly forming a liquid tight seal with the inner and outer pipes by deformation of portions of the annular member when the annular member is inserted to fit within the annular space,
   the portions of the annular member comprising an inner lip of the annular member engaging the inner pipe and an outer lip of the annular member engaging the outer pipe to form the liquid tight seal, the inner lip of the annular member being sized and shaped to extend inward beyond the inner circumference and the outer lip of the annular member being sized and shaped to extend outward beyond the outer circumference, respectively, of a body of the annular member prior to insertion of the annular member to fit within the annular space.

2. A combination of a double-walled pipe and at least one seal assembly according to claim 1, wherein the longitudinal conveying device comprises an electrical conducting device.

3. A combination of a double-walled pipe and at least one seal assembly according to claim 2, wherein the electrical conducting device comprises a rod, or a cable or a plurality thereof.

4. A combination of a double-walled pipe and at least one seal assembly according to claim 1, wherein the longitudinal conveying device comprises a rod traversing the annular member, the rod being configured at one or both ends for connection to a cable.

5. A combination of a double-walled pipe and at least one seal assembly according to claim 4, wherein the rod is connected at one or both ends to a cable, the seal assembly further comprising one or more sleeves covering the connections between the rod and the cable.

6. A combination of a double-walled pipe and at least one seal assembly according to claim 1, wherein the longitudinal conveying device comprises one or more optical fibers housed within optical fiber housing tubes.

7. A combination of a double-walled pipe and at least one seal assembly according to claim 1, wherein the longitudinal conveying device comprises one or more heat transfer devices.

8. A combination of a double-walled pipe and at least one seal assembly according to claim 1, wherein the at least one seal assembly comprises at least one pair of one-sided seal assemblies.

9. A combination of a double-walled pipe and at least one seal assembly according to claim 8, wherein the longitudinal conveying device is at least partially insulated between a pair of one-sided seal assemblies of the at least one pair of one-sided seal assemblies.

10. A combination of a double-walled pipe and at least one seal assembly,
    the double-walled pipe comprising one inner pipe and one outer pipe, the inner and outer pipes being concentrically arranged, the inner pipe being operable to transport a fluid such that the fluid contacts the inner walls of the inner pipe, an annular space being defined between the inner and outer pipes, and
    the seal assembly comprising an annular member dimensioned to fit within the annular space, the seal assembly dividing the annular space longitudinally, the seal assembly further comprising at least one longitudinal conveying device passing through the annular member, wherein the longitudinal conveying device communicates with the annular space on either side of the seal assembly, the seal assembly forming a liquid tight seal with the inner and outer pipes by deformation of a first portion of the annular member contacting the outer wall of the inner pipe, and by deformation of a second portion of the annular member contacting the inner wall of the outer pipe.

11. A combination of a double-walled pipe and at least one seal assembly,
    the double-walled pipe comprising one inner pipe and one outer pipe, the inner and outer pipes being concentrically arranged, an annular space being defined between the inner and outer pipes, and
    the seal assembly comprising an annular member dimensioned to fit within the annular space, the seal assembly dividing the annular space longitudinally, the seal assembly further comprising at least one first longitudinal conveying device passing through the annular member, wherein the first longitudinal conveying device is connected to a second longitudinal conveying device in the annular space on either side of the seal assembly, the annular member comprising a body and inner and outer lips, the body being made of a more rigid material than the inner and outer lips.

12. A combination of a double-walled pipe and at least two seal assemblies,
    the double-walled pipe comprising one inner pipe and one outer pipe, the inner and outer pipes being concentrically arranged, an annular space being defined between the inner and outer pipes, and
    each of the at least two seal assemblies comprising an annular member dimensioned to fit within the annular space, the seal assembly dividing the annular space longitudinally, each of the at least two seal assemblies further comprising at least one longitudinal conveying device passing through the annular member, wherein the longitudinal conveying device communicates with the annular space on either side of the seal assembly, two adjacent seal assemblies of the at least two seal assemblies forming an annular compartment in the annular space to prevent liquid flow in at least one direction, the annular member comprising a body and inner and outer lips.

13. A combination of a double-walled pipe and at least two seal assemblies according to claim 12, wherein the at least one longitudinal conveying devices of the two adjacent seal assemblies are spaced apart from each other.

* * * * *

UNITED STATES PATENT AND TRADEMARK OFFICE
CERTIFICATE OF CORRECTION

PATENT NO. : 7,677,579 B2 Page 1 of 1
APPLICATION NO. : 10/514966
DATED : March 16, 2010
INVENTOR(S) : Michael Antoine Joseph Caroline Bell It is certified that error appears in the above-identified patent and that said Letters Patent is hereby corrected as shown below:

Title page
Please correct the inventor's city of residence to:

Item (75) Inventor:  Michael Antoine Joseph Caroline Bell,
Neuilly-Sur-Seine (FR)

Signed and Sealed this

Eleventh Day of May, 2010

David J. Kappos
*Director of the United States Patent and Trademark Office*